US012738671B2

(12) United States Patent
Xu et al.

(10) Patent No.: US 12,738,671 B2
(45) Date of Patent: Sep. 15, 2026

(54) LOW-FREQUENCY OSCILLATOR UNIT AND ANTENNA

(71) Applicant: Suzhou Luxshare Technology Co., Ltd., Suzhou City (CN)

(72) Inventors: Wenkai Xu, Suzhou City (CN); Chengyu Xu, Suzhou City (CN)

(73) Assignee: SUZHOU LUXSHARE TECHNOLOGY CO., LTD., Suzhou City (CN)

( * ) Notice: Subject to any disclaimer, the term of this patent is extended or adjusted under 35 U.S.C. 154(b) by 112 days.

(21) Appl. No.: 18/821,124

(22) Filed: Aug. 30, 2024

(65) Prior Publication Data

US 2025/0132507 A1 Apr. 24, 2025

(30) Foreign Application Priority Data

Oct. 23, 2023 (CN) ......................... 202311376854.5

(51) Int. Cl.
*H01Q 21/26* (2006.01)
*H01Q 1/38* (2006.01)
*H01Q 21/00* (2006.01)

(52) U.S. Cl.
CPC ............... *H01Q 21/26* (2013.01); *H01Q 1/38* (2013.01); *H01Q 21/0006* (2013.01)

(58) Field of Classification Search
CPC ............ H01Q 1/246; H01Q 1/36; H01Q 1/38; H01Q 1/521; H01Q 21/26; H01Q 21/00; H01Q 21/0006; H01Q 5/371; H01Q 5/42
See application file for complete search history.

(56) References Cited

U.S. PATENT DOCUMENTS

2017/0294704 A1* 10/2017 Sun ........................ H01Q 15/14
2018/0358692 A1* 12/2018 Semonov ................. H01Q 9/28
2021/0194136 A1* 6/2021 Chen ...................... H01Q 21/26
(Continued)

FOREIGN PATENT DOCUMENTS

CN 212412195 U 1/2021
CN 213753054 U 7/2021
(Continued)

*Primary Examiner* — Thai Pham
(74) *Attorney, Agent, or Firm* — Birch, Stewart, Kolasch & Birch, LLP

(57) ABSTRACT

The embodiments of the present disclosure disclose a low-frequency oscillator unit and an antenna. The low-frequency oscillator unit comprises multiple oscillator arms extending outward along the central axis of the low-frequency oscillator unit and spaced apart from each other. The oscillator arm include a dielectric substrate and a conductive layer provided on the dielectric substrate. The conductive layer includes multiple spiral shaped first conductor parts and multiple second conductor parts arranged along the extension direction of the oscillator arm. Adjacent first conductor parts are connected by two spaced second conductor parts, and adjacent first conductor parts are symmetrically arranged. Therefore, the oscillator arm of the low-frequency oscillator unit may eliminate the coupling caused by the low-frequency oscillator unit and the influence between different frequency band oscillator units in the multi frequency antenna through the first conductor parts with multiple sequentially connected spiral shapes.

20 Claims, 5 Drawing Sheets

(56) References Cited

U.S. PATENT DOCUMENTS

| | | | | |
|---|---|---|---|---|
| 2021/0359414 | A1* | 11/2021 | Sundararajan ......... | H01Q 1/521 |
| 2024/0204423 | A1* | 6/2024 | Li .......................... | H01Q 19/10 |

FOREIGN PATENT DOCUMENTS

| | | | |
|---|---|---|---|
| CN | 113285226 | A | 8/2021 |
| CN | 114122717 | A | 3/2022 |
| CN | 115332774 | A | 11/2022 |
| WO | WO 2017/177091 | A1 | 10/2017 |

* cited by examiner

LOW-FREQUENCY OSCILLATOR UNIT AND ANTENNA

CLAIM OF PRIORITY AND CROSS-REFERENCE TO RELATED APPLICATION(S)

This application claims the benefit of Chinese Patent Application No. 202311376854.5, filed on Oct. 23, 2023, which is incorporated herein by reference in its entirety.

BACKGROUND OF THE DISCLOSURE

1. Field of the Disclosure

The present disclosure relates to the field of base station antennas, and particularly to a low-frequency oscillator unit and an antenna.

2. Description of the Related Art

With the multi frequency, miniaturization, and complexity of base station antennas, how to achieve optimal performance indicators in various sub bands of the same antenna has become a bottleneck in the current research and development of base station antennas. A type of oscillator that may achieve high isolation and decoupling function on its own is particularly important.

BRIEF DESCRIPTION OF THE DISCLOSURE

In view of this, the present disclosure provides a low-frequency oscillator unit and an antenna with good high isolation and decoupling function.

In the first aspect, the embodiment of the present disclosure provides a low-frequency oscillator unit, wherein the low-frequency oscillator unit comprises a plurality of oscillator arms extending outwardly along the central axis of the low-frequency oscillator unit and arranged at intervals, each oscillator arm comprises a dielectric substrate and a conductive layer arranged on the dielectric substrate, the conductive layer comprises a plurality of spiral-shaped first conductor parts and a plurality of second conductor parts arranged along the extending direction of the oscillator arm, the adjacent first conductor parts are connected by two second conductor parts arranged at intervals, and two adjacent first conductor parts are symmetrically arranged.

Furthermore, the first conductor part comprises a first branch, a second branch and a third branch that are arranged coaxially in a sequential manner from inside to outside, and the first branch, the second branch and the third branch each have a first opening, a second opening and a third opening arranged on the same side, respectively; the first end of the first opening is connected to the second end of the second opening through a fourth branch, the first end of the second opening is connected to the second end of the third opening through a fifth branch, the fourth branch and the fifth branch are arranged at intervals.

Furthermore, the first conductor part is in a square spiral shape, the first branch is in a square structure, the second branch and the third branch are in a square ring structure, the circumference of the first branch is one-fourth of a wavelength at the center frequency of the operating band of a high-frequency oscillator unit, the circumference of the second branch is one-third of the wavelength at the center frequency of the operating band of the high-frequency oscillator unit, and the circumference of the third branch is one-half of the wavelength at the center frequency of the operating band of the high-frequency oscillator unit.

Furthermore, the first conductor part is in a circular spiral shape, the first branch is in a circular structure, the second branch and the third branch are in a circular ring structure, the circumference of the first branch is one third of a wavelength at the center frequency of the operating band of a high-frequency oscillator unit, the circumference of the second branch is one half of the wavelength at the center frequency of the operating band of the high-frequency oscillator unit, and the length of the third branch is two thirds of the wavelength at the center frequency of the operating band of the high-frequency oscillator unit.

Furthermore, the oscillator arm comprises three spiral-shaped first conductor parts, and two adjacent first conductor parts on the outer side are connected by the two conductor parts to form a closed structure, and the two second conductor parts between the two adjacent first conductor parts are located outside two ends of the third opening.

Furthermore, the low-frequency oscillator unit further comprises a guiding piece having guiding arms equal in number to the oscillator arms, the extension direction of the guiding arms corresponding to the extension direction of the oscillator arms, the guiding arms being disposed above the corresponding oscillator arms, and a predetermined interval being provided between the guiding arms and the oscillator arms.

Furthermore, the low-frequency oscillator unit has four oscillator arms arranged orthogonally to each other, and the oscillator arms are arranged perpendicular to the guiding piece; the guiding piece has four guide arms arranged orthogonally to each other, making the guiding piece form a cross shape, and the guiding piece has a cross-shaped hollow pattern.

Furthermore, the low-frequency oscillator unit further comprises: a feeding plate, the feeding plate being provided with feeding lines and interfaces electrically connected to an external coaxial cable; and a balun assembly connected to the feeding plate, the balun assembly comprising a plurality of baluns, each of the baluns having two oscillator arms fixed on both sides, and the baluns being electrically connected to the feeding lines and the corresponding oscillator arms.

Furthermore, the low-frequency oscillator unit further comprises a guiding plate supporting the guiding piece, the guiding plate has a shape matching the guiding piece, and a connecting plate extends upward from the top of the balun, the guiding plate is fixedly connected to the connecting plate, so that there is a predetermined interval between the guiding piece and the oscillator arms.

In the second aspect, the embodiment of the present disclosure provides an antenna, comprising at least two low-frequency oscillator units as described in the first aspect, and the low-frequency oscillator units are arranged in an array.

The embodiments of the present disclosure provide a low-frequency oscillator unit and an antenna. The low-frequency oscillator unit comprises multiple oscillator arms extending outward along the central axis of the low-frequency oscillator unit and spaced apart from each other. The oscillator arm include a dielectric substrate and a conductive layer provided on the dielectric substrate. The conductive layer includes multiple spiral shaped first conductor parts and multiple second conductor parts arranged along the extension direction of the oscillator arm. Adjacent first conductor parts are connected by two spaced second conductor parts, and adjacent first conductor parts are symmetrically arranged. Therefore, the oscillator arm of the low-frequency oscillator unit may eliminate the coupling caused by the low-frequency oscillator unit and the influence between different frequency band oscillator units in the multi frequency antenna through the first conductor parts with multiple sequentially connected spiral shapes.

BRIEF DESCRIPTION OF THE DRAWINGS

The above and other objectives, features, and advantages of the disclosure will become clearer through the description of the embodiment of the disclosure with reference to the accompanying drawings, in which.

DETAILED DESCRIPTION OF EMBODIMENTS OF THE DISCLOSURE

The following describes this application based on embodiments, but this application is not limited to these embodiments. In the following detailed description of this application, some specific details are elaborately described. For those skilled in the art, the absence of detailed descriptions of these details does not prevent them from fully understanding this application. To avoid confusing the essence of this application, well-known methods, processes, flows, components, and circuits are not detailed.

In addition, those skilled in the art should understand that the figures provided here are for illustrative purposes only, and the figures may not be drawn to scale.

Unless otherwise clearly specified and defined, the terms "installation", "connection", "fixation", and others should be understood broadly. For example, they may be fixed connections, or they may be detachable connections, or integrated; they may be mechanical connections, or electrical connections; they may be direct connections, or indirect connections through an intermediate medium, they may be internal connections between two components or the interaction between two components, unless otherwise clearly defined. For those skilled in the art, the specific meaning of the above terms in this application may be understood based on the specific situation.

Unless explicitly required by the context, the words "include", "contains", and similar terms throughout the application document should be interpreted as inclusive rather than exclusive or exhaustive; that is, they have the meaning of "including but not limited to".

In the description of this application, it is necessary to understand that the terms "first", "second", etc. are only used for descriptive purposes and should not be understood as indicating or implying relative importance. Furthermore, in the description of this application, unless otherwise specified, the meaning of "multiple" is two or more.

Figure 1:
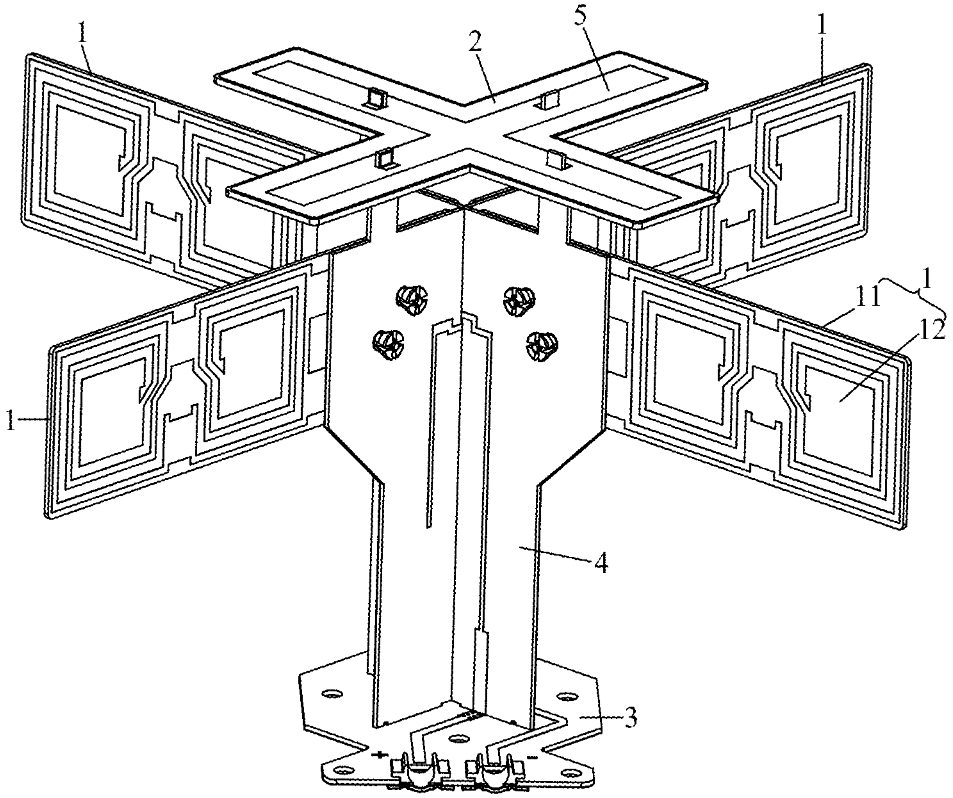
FIG. 1 is a schematic diagram of the structure of a low-frequency oscillator unit according to an embodiment of the present disclosure.
Figure 7:
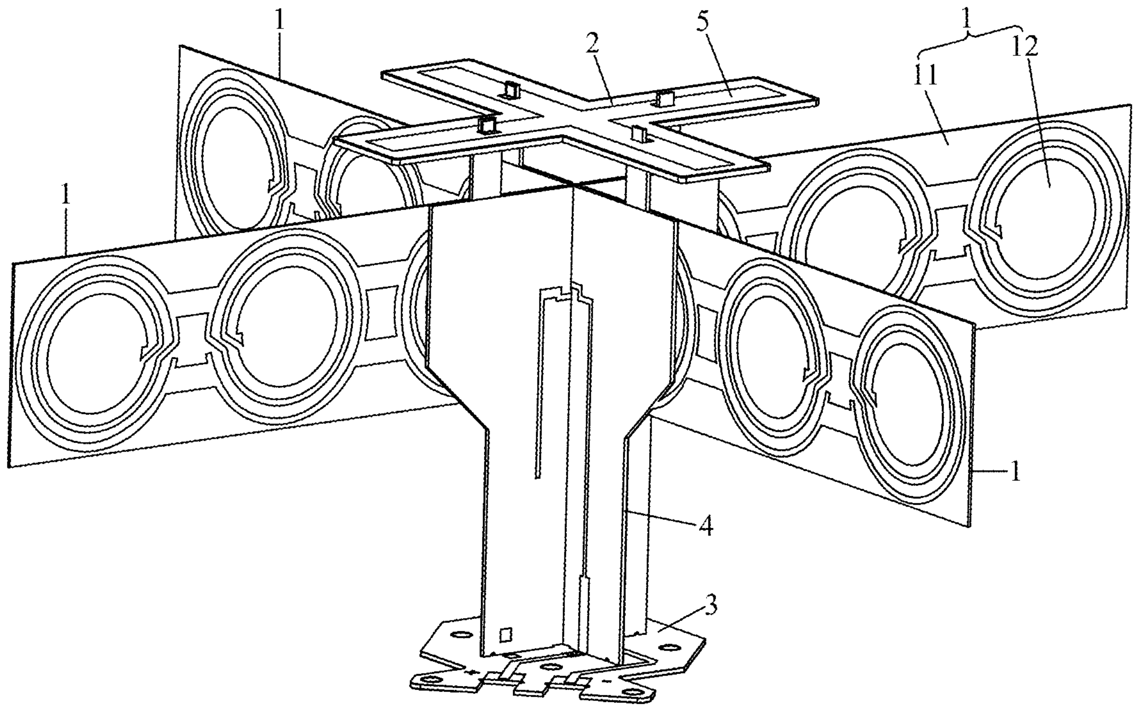
FIG. 7 is another schematic diagram of the structure of a low-frequency oscillator unit in the embodiment of the present disclosure.

FIG. 1 and FIG. 7 are schematic diagrams of three-dimensional structure of the low-frequency oscillator unit according to an embodiment of the present disclosure. As shown in FIG. 1 and FIG. 7, the low-frequency oscillator unit comprises a plurality of oscillator arms 1. The multiple oscillator arms 1 extend outwardly along the central axis of the low-frequency oscillator unit and are arranged at intervals, with the extension direction of each oscillator arm 1 forming a first plane. The multiple oscillator arms 1 are arranged around the central axis of the low-frequency oscillator unit, that is, they are arranged in a circular array centered on the central axis, with a certain angle between each other. The material of the oscillator arms 1 is conductive material.

In this embodiment, the first plane is a horizontal plane. The multiple oscillator arms 1 of the low-frequency oscillator unit are all arranged perpendicular to the first plane, forming a sheet-like shape perpendicular to the horizontal plane.

Figure 2:
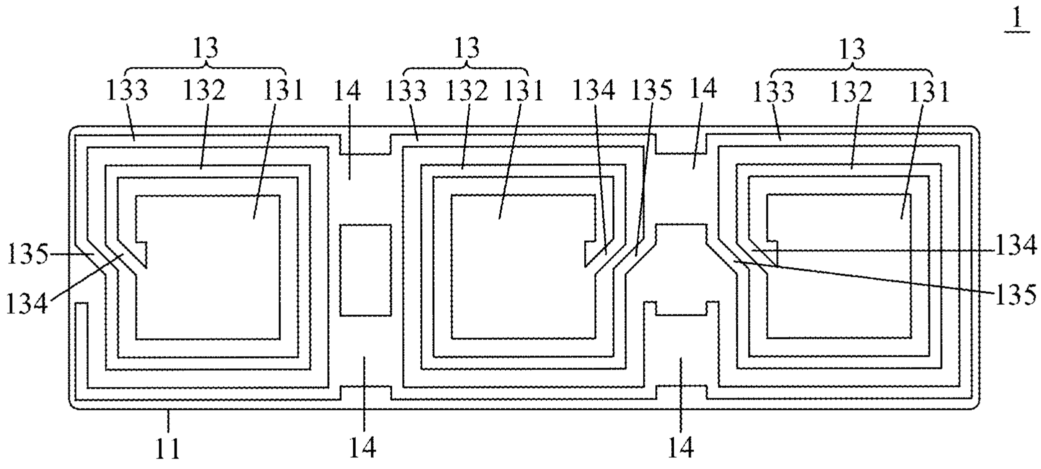
FIG. 2 is a schematic diagram of the structure of an oscillator arm according to an embodiment of the present disclosure.
Figure 6:
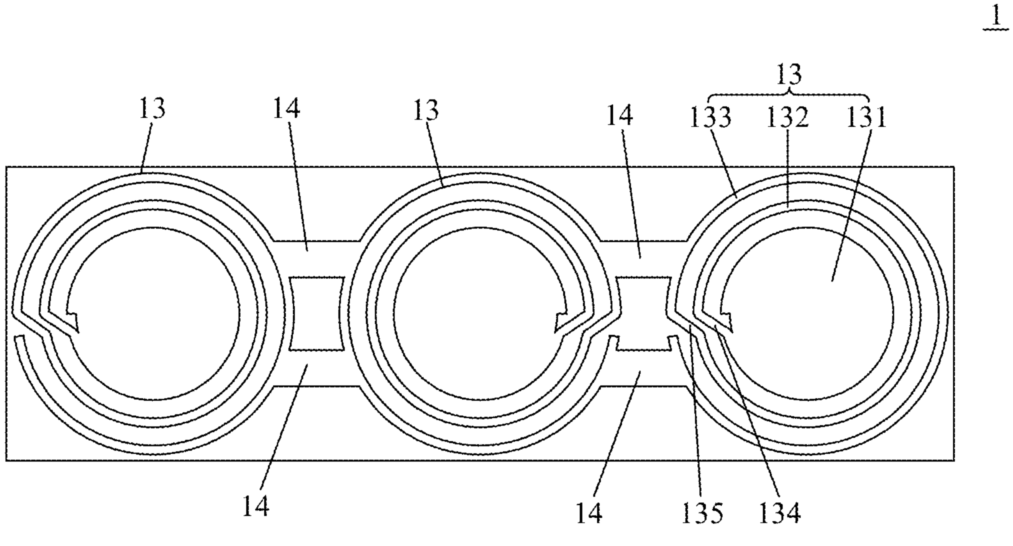
FIG. 6 is another schematic diagram of the structure of an oscillator arm in the embodiment of the present disclosure.

FIG. 2 and FIG. 6 are schematic diagrams of different structures of the oscillator arm in the embodiment of the present disclosure. As shown in FIG. 2 and FIG. 6, the oscillator arm 1 includes a dielectric substrate 11 and a conductive layer 12 arranged on the dielectric substrate 11. The conductive layer 12 includes a plurality of spiral-shaped first conductor parts 13 and a plurality of second conductor parts 14 arranged along the extension direction of the oscillator arm 1. Adjacent first conductor parts 13 are connected by two second conductor parts 14 arranged at intervals, and two adjacent first conductor parts 13 are symmetrically arranged. The dielectric substrate 11 may protect the conductive layer 12 and increase capacitive coupling. It should be noted that, as an alternative embodiment, the conductive layer 12 is a copper layer. Therefore, the low-frequency oscillator unit may achieve good decoupling effects through the oscillator arm 1 with multiple spiral shapes.

In this embodiment, each oscillator arm 1 is a PCB board with a heat resistance rating of FR-4, primarily made of epoxy resin and glass fiber.

As shown in FIG. 2 and FIG. 6, the first conductor part 13 includes a first branch 131, a second branch 132, and a third branch 133, which are sequentially nested and coaxially arranged from the inside out. The first branch 131, the second branch 132, and the third branch 133 each have a first opening, a second opening, and a third opening, respectively, which are arranged on the same side. A first end of the first opening is connected to a second end of the second opening through a fourth branch 134, and a first end of the second opening is connected to a second end of the third opening through a fifth branch 135. The fourth branch 134 and the fifth branch 135 are spaced apart, thereby forming a spiral shape with an opening at one end of the first conductor part 13, with the first branch 131, the second branch 132, and the third branch 133 being sequentially connected. The spiral shape of the first conductor part 13 mentioned above allows the low-frequency oscillator unit to have a stealth decoupling effect.

In this embodiment, the oscillator arm 1 includes three spiral-shaped first conductor parts 13. The openings of two adjacent first conductor parts 13 on the outside are arranged opposite each other and are connected by two conductor parts. Two second conductor parts 14 are connected on the outside of the two third openings of the adjacent first conductor parts 13, forming a closed structure for the two outer first conductor parts 13. The openings of two adjacent first conductor parts 13 on the inside are arranged opposite each other and are connected by two conductor parts. Two second conductor parts 14 are connected on the side opposite the opposing openings of the adjacent first conductor parts 13 on the inside. The first end of the third opening of the innermost first conductor part 13 is a free end. The oscillator arm 1 is electrically connected to the balun assembly through the first end of the third opening of the innermost first conductor part 13 to achieve feeding. In this arrangement, the oscillator arm 1 is equipped with three spiral-shaped first conductor parts 13 so that the side length of each first conductor part 13 approaches one-fourth of the wavelength of the low-frequency oscillator unit band, effectively eliminating the coupling caused by the low-frequency oscillator unit.

As shown in FIG. 2, in one embodiment, the first conductor part 13 is in the shape of a square spiral. That is, the first branch 131 is a square structure, and the second branch 132 and the third branch 133 are square-ring structures. The circumference of the first branch 131 is one-quarter of the wavelength at the center frequency of the operating band of the high-frequency oscillator unit, the circumference of the second branch 132 is one-third of the wavelength at the center frequency of the operating band of the high-frequency oscillator unit, and the circumference of the third branch 133 is one-half of the wavelength at the center frequency of the operating band of the high-frequency oscillator unit. This size design enables the low-frequency oscillator unit to achieve better operating effects.

As shown in FIG. 6, in another embodiment, the first conductor part 13 is in the shape of a circular spiral. That is, the first branch 131 is a circular structure, the second branch 132 and the third branch 133 are circular ring structures, the circumference of the first branch 131 is one-third of the wavelength at the center frequency of the operating band of the high-frequency oscillator unit, the circumference of the second branch 132 is one-half of the wavelength at the center frequency of the operating band of the high-frequency oscillator unit, and the length of the third branch 133 is two-thirds of the wavelength at the center frequency of the operating band of the high-frequency oscillator unit. This size design enables the low-frequency oscillator unit to achieve better working effects.

Optionally, the first conductor part 13 may also be arranged in other spiral structures, which is not limited in this application.

Furthermore, as shown in FIG. 1 and FIG. 7, the low-frequency oscillator unit also includes a guiding piece 2. The guiding piece 2 is arranged above multiple oscillator arms 1 in parallel with the first plane, with a predetermined gap between the guiding piece 2 and the oscillator arm 1. That is, multiple oscillator arms 1 are located on the same plane, and the oscillator arms 1 and the guiding piece 2 are arranged on two parallel planes, with a certain gap between the two planes, so that the guiding piece 2 is positioned higher than the oscillator arms 1. The guiding piece 2 is formed as a thin sheet with a hollowed-out pattern. The material of the guiding piece 2 is conductive metal. In this embodiment, the material of the guiding piece 2 is copper. Optionally, the guiding piece 2 may also be made of other materials. It should be noted that by opening a hollowed-out pattern on the guiding piece 2, it is possible to reduce its impact on the low-frequency oscillator unit and improve the cross-polarization ratio after the unit is arrayed, thereby making the signal spatial directivity and decoupling stronger after the unit is arrayed.

Figure 3:
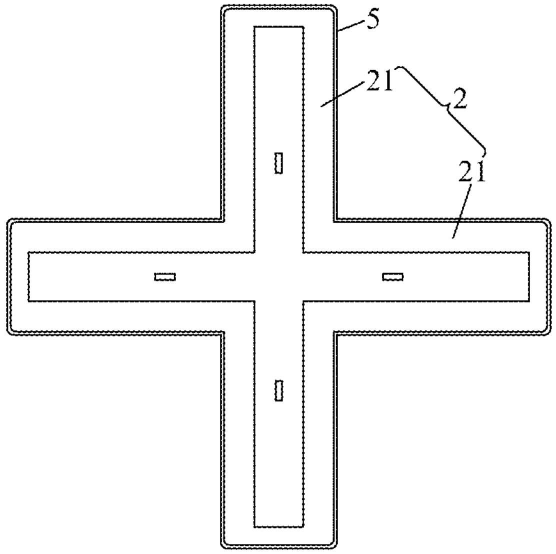
FIG. 3 is a schematic diagram of the structure of a guiding piece and a guiding plate in the embodiment of the present disclosure.

FIG. 3 is a structural schematic diagram of the guiding piece and guiding plate in an embodiment of the present disclosure. As shown in FIG. 3, the guiding piece 2 has guiding arms 21, which are equal in number to the oscillator arms 1. The extension direction of the guiding arms 21 corresponds to that of the oscillator arms 1. In other words, the guiding piece 2 has protrusions equal in number to the oscillator arms 1, formed as guiding arms 21, with the same extension direction as the oscillator arms 1, that is, also arranged around the central axis of the low-frequency oscillator unit, with a preset angular spacing between them. This design facilitates the formation of resonant waves between the guiding piece 2 and the oscillator arms 1, to achieve a filtering effect and improve isolation.

In this embodiment, as shown in FIG. 1 and FIG. 7, the low-frequency oscillator unit has four oscillator arms 1 arranged orthogonally to each other, all set perpendicular to the first plane, that is, the oscillator arms 1 are arranged perpendicular to the guiding piece 2. In other words, the four oscillator arms 1 are arranged at 90° intervals around the central axis of the low-frequency oscillator unit, forming a sheet perpendicular to the horizontal plane. The guiding piece 2 has four guiding arms 21 arranged orthogonally to each other, making it form a cross shape, and it has a hollowed-out pattern in the shape of a cross. That is to say, the guiding piece 2 is formed as a strip with a certain width, forming a hollow cross shape around it. Optionally, the oscillator arms 1 and the guiding piece 2 may have other arrangements, which are not limited in this application.

Figure 4:
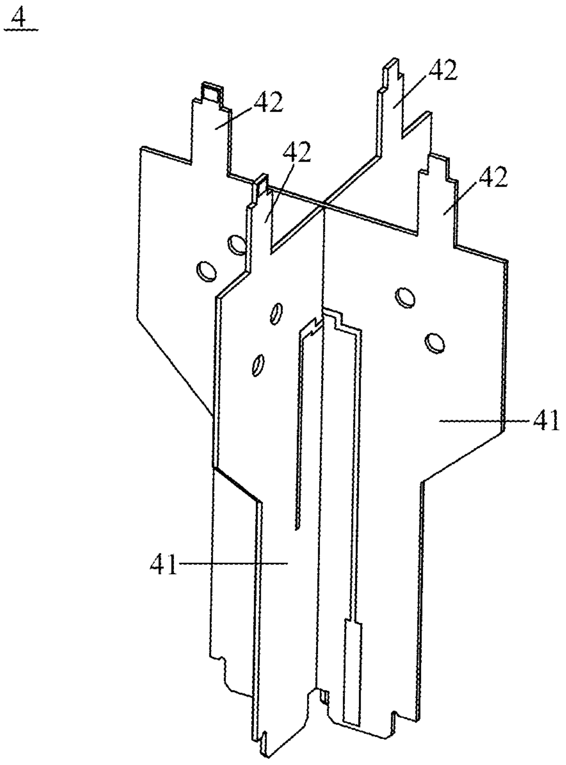
FIG. 4 is a schematic diagram of the structure of a balun assembly according to an embodiment of the present disclosure.
Figure 5:
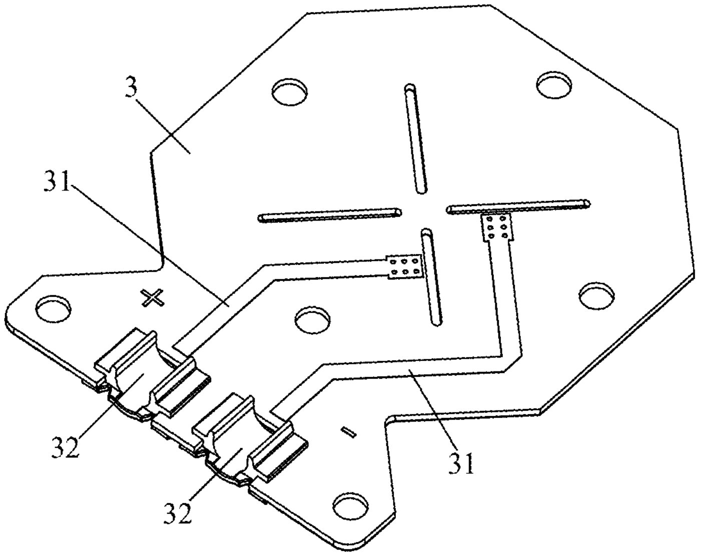
FIG. 5 is a schematic diagram of the structure of a feeding plate according to an embodiment of the present disclosure.

FIG. 4 is a structural schematic diagram of the balun assembly of the low-frequency oscillator unit according to an embodiment of the present disclosure. FIG. 5 is a structural schematic diagram of the feeding plate of the low-frequency oscillator unit according to an embodiment of the present disclosure. As shown in FIG. 4 and FIG. 5, the low-frequency oscillator unit also includes a feeding plate 3 and a balun assembly 4, with the feeding plate 3 electrically connected to the oscillator arms 1 through the balun assembly 4. The balun assembly 4 is connected to the feeding plate 3, and the oscillator arms 1 are connected to the balun assembly 4. The balun assembly 4 is electrically connected to the feeding plate 3. The oscillator arms 1 are electrically connected to the balun assembly 4. Thus, the oscillator arms 1 are electrically connected to the feeding plate 3 through the balun assembly 4. As shown in FIG. 5, the feeding plate 3 includes feeding lines 31 and interfaces 32. One end of each feeding line 31 is electrically connected to an interface 32, which is used for electrical connection with an external coaxial cable. The feeding plate 3 is also provided with mounting slots, and the balun assembly 4 is inserted into the mounting slots of the feeding plate 3 to achieve connection. The use of the external coaxial cable for electrical connection stabilizes the structure of the low-frequency oscillator unit, reduces the risk of matching discontinuity, and has certain advantages in intermodulation.

As shown in FIG. 4, the balun assembly 4 includes multiple baluns 41. The oscillator arms 1 are fixed at a position near the top on one side of the baluns 41, and each balun 41 is electrically connected to the feeding line 31 and the corresponding oscillator arm 1. The balun assembly 4 is vertically arranged on the feeding plate 3, which is arranged parallel to the first plane. Each oscillator arm 1 is overlapped and fixed with the corresponding balun 41 part through fasteners.

In this embodiment, the balun assembly 4 includes two cross-connected baluns 41, with two oscillator arms 1 respectively fixed on both sides of each balun 41. The mounting slots of the feeding plate 3 are designed to match the two baluns 41 in a cross shape, allowing the balun assembly 4 to be plugged onto the feeding plate 3 and fed power through two feeding lines 31 to the two baluns 41 respectively. This design enables the feeding plate 3 and the balun assembly 4 to provide a certain level of support for the structure of the low-frequency oscillator unit. Alternatively, the feeding plate 3 and the balun assembly 4 may also have other structures.

Furthermore, to ensure a predetermined gap between the guiding piece 2 and the oscillator arms 1, the low-frequency oscillator unit also includes a guiding plate 5. The guiding plate 5 has a shape that matches the guiding piece 2, and the guiding piece 2 is placed on the guiding plate 5, which is configured to support the guiding piece 2. That is to say, since the guiding piece 2 is formed as a thin plate, it is prone to deformation, and a guiding plate 5 that matches its shape needs to be provided to support it.

In this embodiment, the guiding plate 5 is fixedly connected above the top of the balun assembly 4. The top of the balun 41 extends upwards with connecting plates 42, and the guiding plate 5 is fixedly connected to the connecting plates 42, ensuring a predetermined gap between the guiding piece 2 and the oscillator arms 1. The length of the connecting plate 42 may be adjusted according to the distance required between the oscillator arms 1 and the guiding piece 2, to suit the performance of the low-frequency oscillator unit. The number of connecting plates 42 is the same as the number of guiding arms 21, and they correspond one-to-one. In this implementation, the guiding plate 5 is shaped like a cross similar to the guiding piece 2, and is integrally formed with the guiding piece 2. A through hole for the connecting plate 42 to pass through is provided on the guiding plate 5 at the position corresponding to the cross-shaped hollow pattern of the guiding piece 2. Optionally, the guiding plate 5 may have other shapes, and its connection method with the guiding piece 2 may also vary, for example, by adhering the two together. The material of the guiding plate 5 may also be changed to other insulating materials.

This embodiment also provides an antenna, which includes at least two low-frequency oscillator units arranged in an array. In addition, the antenna also includes high-frequency oscillator units arranged in an array, which are placed directly below the low-frequency oscillator units. The structure of the low-frequency oscillator units is as described above and will not be repeated here. It should be noted that the antenna may be a MIMO antenna, a laptop antenna, a base station antenna, etc. As can be seen from the above, by arranging the low-frequency oscillator units, the isolation may be improved and a better decoupling effect may be achieved.

Figure 8:
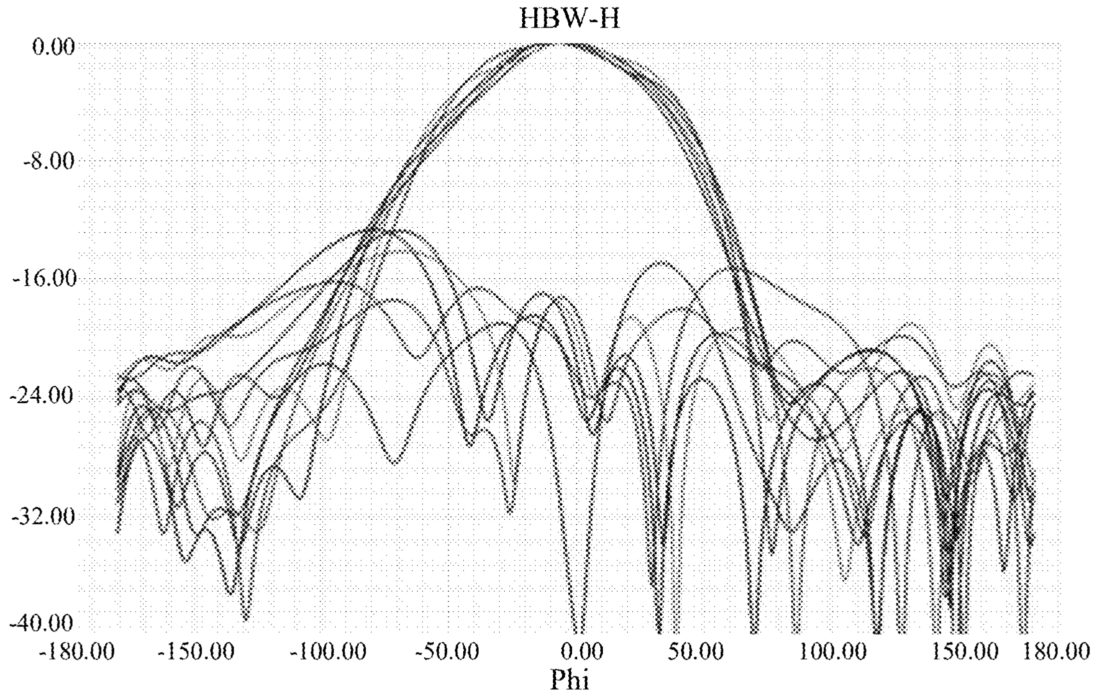
FIG. 8 is a directional diagram of high-frequency oscillator units of an antenna in the embodiment of the present disclosure.
Figure 9:
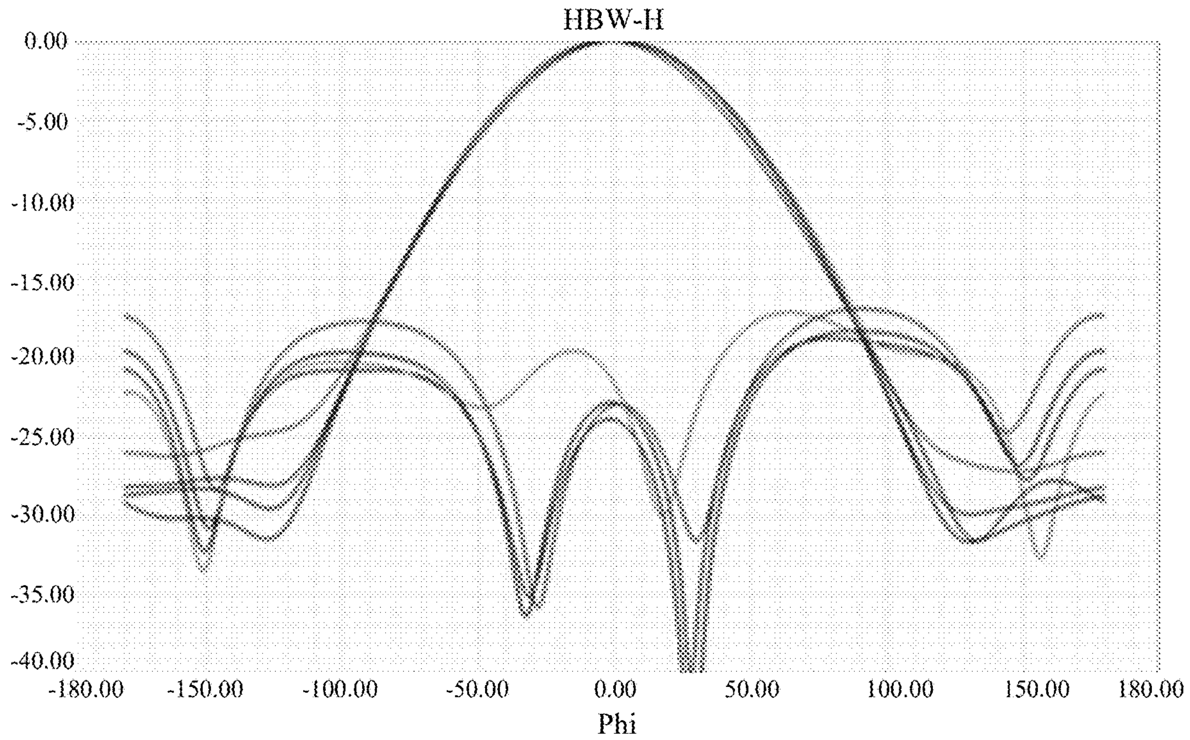
FIG. 9 is a directional diagram of low-frequency oscillator units of an antenna in the embodiment of the present disclosure.
Figure 10:
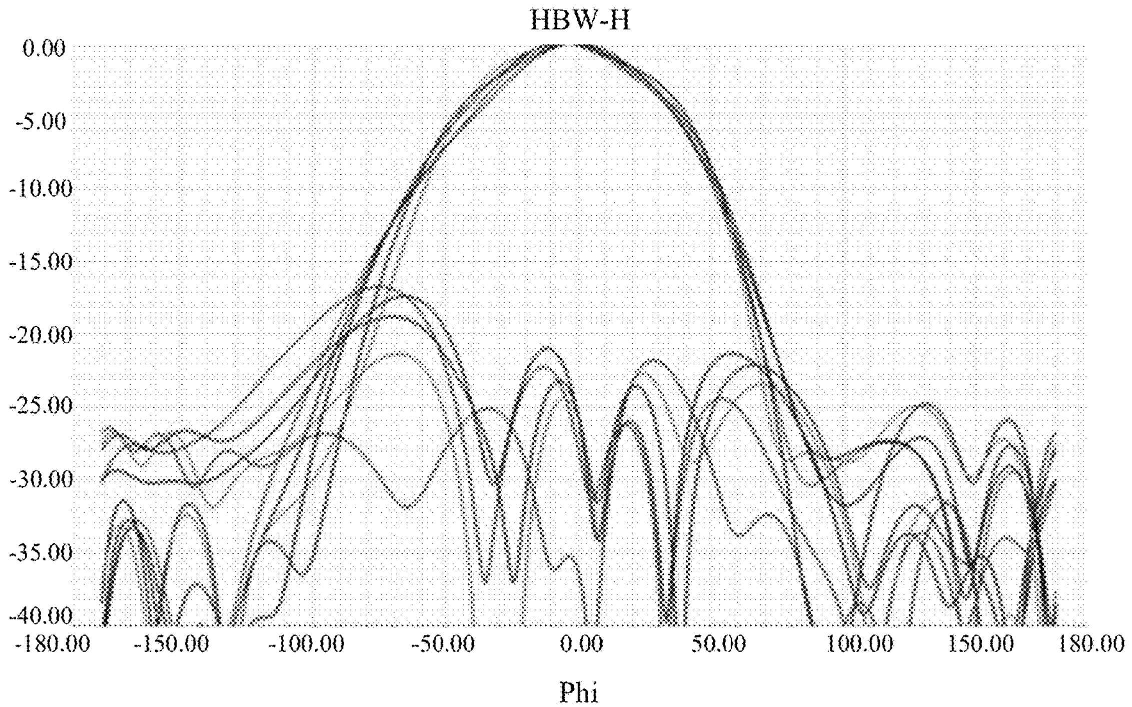
FIG. 10 is a directional diagram of a single array of high-frequency oscillator units.

FIG. 8 is the directional diagram of the high-frequency oscillator units of the antenna according to an embodiment of the present disclosure. FIG. 9 is the directional diagram of the low-frequency oscillator units of the antenna according to an embodiment of the present disclosure. As shown in FIG. 8, after the low-frequency oscillator units and the high-frequency oscillator units with the above-mentioned structure are arrayed, the directional diagram of the high-frequency oscillator units is free from distortion and the beam converges to 56°-62°, indicating excellent performance in the high-frequency directional diagram. As shown in FIG. 9, after the low-frequency oscillator units and the high-frequency oscillator units with the above-mentioned structure are arrayed, the low-frequency directional diagram is not affected by the high-frequency, the waveform is free from distortion, and the beam converges to 68°-69°. FIG. 10 is the directional diagram of a single array of the high-frequency oscillator units. As shown in FIG. 8 and FIG. 10, the directional diagram of the high-frequency oscillator units of the antenna is basically consistent with that of the single array of the high-frequency oscillator units, achieving the stealth decoupling effect of the low-frequency oscillator unit.

The low-frequency oscillator unit and antenna of the embodiment of the present disclosure, the low-frequency oscillator unit comprises a plurality of oscillator arms extending outwardly along the central axis of the low-frequency oscillator unit and spaced apart from each other, the oscillator arms include a dielectric substrate and a conductive layer arranged on the dielectric substrate, the conductive layer includes a plurality of spiral-shaped first conductor parts and a plurality of second conductor parts arranged along the extension direction of the oscillator arm, adjacent first conductor parts are connected by two second conductor parts arranged at intervals, and adjacent two first conductor parts are symmetrically arranged. Thus, the oscillator arm of the low-frequency oscillator unit may eliminate the coupling brought by the low-frequency oscillator unit and the influence between the oscillator units of different frequency bands in the multi-frequency antenna through the first conductor parts with a plurality of sequentially connected spiral shapes.

The above-mentioned is only a preferred embodiment of this application and is not intended to limit this application. For those skilled in the art, this application may be subject to various modifications and variations. Any modifications, equivalent replacements, and improvements made within the spirit and principle of this application should be included in the scope of protection of this application.

We claim:

1. A low-frequency oscillator unit, wherein the low-frequency oscillator unit comprises a plurality of oscillator arms extending outwardly along the central axis of the low-frequency oscillator unit and spaced apart from each other, each oscillator arm comprises a dielectric substrate and a conductive layer arranged on the dielectric substrate, the conductive layer comprises a plurality of spiral-shaped first conductor parts and a plurality of second conductor parts arranged along the extending direction of the oscillator arm, adjacent first conductor parts of the plurality of spiral-shaped first conductor parts are connected by two second conductor parts of the plurality of second conductor parts that are spaced apart from each other, and the two adjacent first conductor parts are symmetrically arranged.

2. The low-frequency oscillator unit according to claim 1, wherein each first conductor part of the plurality of spiral-shaped first conductor parts comprises a first branch, a second branch and a third branch that are arranged coaxially in a sequential manner from inside to outside, and the first branch, the second branch and the third branch each have a first opening, a second opening and a third opening arranged on the same side, respectively; a first end of the first opening is connected to a second end of the second opening through a fourth branch, a first end of the second opening is connected to a second end of the third opening through a fifth branch, the fourth branch and the fifth branch are spaced apart.

3. The low-frequency oscillator unit according to claim 2, wherein the oscillator arm comprises three spiral-shaped first conductor parts, and two adjacent first conductor parts on the outer side are connected by two conductor parts of the plurality of second conductor parts that are spaced apart from each other to form a closed structure, and the two second conductor parts between the two adjacent first conductor parts are located outside two ends of the third opening.

4. The low-frequency oscillator unit according to claim 2, wherein the first conductor part is in a square spiral shape, the first branch is in a square structure, the second branch and the third branch are in a square ring structure.

5. The low-frequency oscillator unit according to claim 4, wherein a circumference of the first branch is one-fourth of a wavelength at the center frequency of the operating band of a high-frequency oscillator unit, a circumference of the second branch is one-third of the wavelength at the center frequency of the operating band of the high-frequency oscillator unit, and a circumference of the third branch is one-half of the wavelength at the center frequency of the operating band of the high-frequency oscillator unit, wherein the high-frequency oscillator unit and the low-frequency oscillator unit are arrayed to form an antenna.

6. The low-frequency oscillator unit according to claim 5, wherein the oscillator arm comprises three spiral-shaped first conductor parts, and two adjacent first conductor parts on the outer side are connected by the two conductor parts of the plurality of second conductor parts that are spaced apart from each other to form a closed structure, and the two second conductor parts between the two adjacent first conductor parts are located outside two ends of the third opening.

7. The low-frequency oscillator unit according to claim 2, wherein the first conductor part is in a circular spiral shape, the first branch is in a circular structure, the second branch and the third branch are in a circular ring structure.

8. The low-frequency oscillator unit according to claim 7, wherein the circumference of the first branch is one third of a wavelength at the center frequency of the operating band of a high-frequency oscillator unit, the circumference of the second branch is one half of the wavelength at the center frequency of the operating band of the high-frequency oscillator unit, and the length of the third branch is two thirds of the wavelength at the center frequency of the operating band of the high-frequency oscillator unit, wherein the high-frequency oscillator unit and the low-frequency oscillator unit are arrayed to form an antenna.

9. The low-frequency oscillator unit according to claim 8, wherein the oscillator arm comprises three spiral-shaped first conductor parts, and two adjacent first conductor parts on the outer side are connected by two conductor parts of the plurality of second conductor parts that are spaced apart from each other to form a closed structure, and the two second conductor parts between the two adjacent first conductor parts are located outside two ends of the third opening.

10. The low-frequency oscillator unit according to claim 1, wherein the low-frequency oscillator unit further comprises a guiding piece having guiding arms equal in number to the oscillator arms, the extension direction of the guiding arms corresponding to the extension direction of the oscillator arms, the guiding arms being disposed above the corresponding oscillator arms, and a predetermined interval being provided between the guiding arms and the oscillator arms.

11. The low-frequency oscillator unit according to claim 10, wherein the low-frequency oscillator unit further comprises:

a feeding plate, the feeding plate being provided with feeding lines and interfaces electrically connected to an external coaxial cable; and a balun assembly connected to the feeding plate, the balun assembly comprising a plurality of baluns, each of the baluns having two oscillator arms fixed on both sides, and the baluns being electrically connected to the feeding lines and the corresponding oscillator arms.

12. The low-frequency oscillator unit according to claim 11, wherein the low-frequency oscillator unit further comprises a guiding plate supporting the guiding piece, the guiding plate has a shape matching the guiding piece, and a connecting plate extends upward from the top of the balun, the guiding plate is fixedly connected to the connecting plate, so that there is a predetermined interval between the guiding piece and the oscillator arms.

13. The low-frequency oscillator unit according to claim 10, wherein the low-frequency oscillator unit has four oscillator arms arranged orthogonally to each other, and the oscillator arms are arranged perpendicular to the guiding piece.

14. The low-frequency oscillator unit according to claim 13, wherein the guiding piece has four guide arms arranged orthogonally to each other, making the guiding piece form a cross shape, and the guiding piece has a cross-shaped hollow pattern.

15. The low-frequency oscillator unit according to claim 14, wherein the low-frequency oscillator unit further comprises:

a feeding plate, the feeding plate being provided with feeding lines and interfaces electrically connected to an external coaxial cable; and a balun assembly connected to the feeding plate, the balun assembly comprising a plurality of baluns, each of the baluns having two oscillator arms fixed on both sides, and the baluns being electrically connected to the feeding lines and the corresponding oscillator arms.

16. The low-frequency oscillator unit according to claim 15, wherein the low-frequency oscillator unit further comprises a guiding plate supporting the guiding piece, the guiding plate has a shape matching the guiding piece, and a connecting plate extends upward from the top of the balun, the guiding plate is fixedly connected to the connecting plate, so that there is a predetermined interval between the guiding piece and the oscillator arms.

17. An antenna, comprises at least two low-frequency oscillator units of claim 1, and the low-frequency oscillator units are arranged in an array.

18. The antenna according to claim 17, wherein the first conductor part comprises a first branch, a second branch and a third branch that are arranged coaxially in a sequential manner from inside to outside, and the first branch, the second branch and the third branch each have a first opening, a second opening and a third opening arranged on the same side, respectively; the first end of the first opening is connected to the second end of the second opening through a fourth branch, the first end of the second opening is connected to the second end of the third opening through a fifth branch, the fourth branch and the fifth branch are arranged at intervals.

19. The antenna according to claim 17, wherein the low-frequency oscillator unit further comprises a guiding piece having guiding arms equal in number to the oscillator arms, the extension direction of the guiding arms corresponding to the extension direction of the oscillator arms, the guiding arms being disposed above the corresponding oscillator arms, and a predetermined interval being provided between the guiding arms and the oscillator arms.

20. The antenna according to claim 19, wherein the low-frequency oscillator unit further comprises:

a feeding plate, the feeding plate being provided with feeding lines and interfaces electrically connected to an external coaxial cable; and a balun assembly connected to the feeding plate, the balun assembly comprising a plurality of baluns, each of the baluns having two oscillator arms fixed on both sides, and the baluns being electrically connected to the feeding lines and the corresponding oscillator arms.

* * * * *